(12) United States Patent
He

(10) Patent No.: US 12,449,263 B2
(45) Date of Patent: Oct. 21, 2025

(54) MAP MATCHING METHOD AND APPARATUS, ELECTRONIC DEVICE AND STORAGE MEDIUM

(71) Applicant: UISEE TECHNOLOGIES (BEIJING) LTD., Beijing (CN)

(72) Inventor: Xiao He, Beijing (CN)

(73) Assignee: UISEE TECHNOLOGIES (BEIJING) LTD., Beijing (CN)

( * ) Notice: Subject to any disclaimer, the term of this patent is extended or adjusted under 35 U.S.C. 154(b) by 303 days.

(21) Appl. No.: 18/028,565

(22) PCT Filed: Oct. 23, 2020

(86) PCT No.: PCT/CN2020/123162
§ 371 (c)(1),
(2) Date: Mar. 27, 2023

(87) PCT Pub. No.: WO2022/062019
PCT Pub. Date: Mar. 31, 2022

(65) Prior Publication Data
US 2023/0358547 A1    Nov. 9, 2023

(30) Foreign Application Priority Data
Sep. 27, 2020    (CN) .......................... 202011031457.0

(51) Int. Cl.
*G01C 21/30*    (2006.01)
(52) U.S. Cl.
CPC .................................... *G01C 21/30* (2013.01)
(58) Field of Classification Search
CPC .... G01C 21/30; G01C 21/32; G01C 21/3848; G01C 21/3859; G01C 21/387; Y02T 10/40
See application file for complete search history.

(56) References Cited

U.S. PATENT DOCUMENTS

2010/0324815 A1    12/2010    Hiruta et al.
2018/0268566 A1    9/2018    Houts et al.
(Continued)

FOREIGN PATENT DOCUMENTS

CN    102313547 A    1/2012
CN    107144285 A    9/2017
(Continued)

OTHER PUBLICATIONS

Machine Translation of WO-2021190167-A1 (Year: 2021).*
(Continued)

*Primary Examiner* — Sahar Motazedi
(74) *Attorney, Agent, or Firm* — Bayramoglu Law Offices

(57) ABSTRACT

A map matching method and apparatus, an electronic device and a storage medium are provided. The method includes: acquiring initial positioning information of a vehicle and vehicle sensor data; determining a plurality of pieces of candidate positioning information on the basis of the initial positioning information; determining a plurality of observation semantic features on the basis of the vehicle sensor data; acquiring local map information on the basis of the initial positioning information of the vehicle, the local map information including a plurality of map semantic features; for each piece of candidate positioning information: converting the plurality of map semantic features into a coordinate system of the vehicle sensor; and matching the plurality of observation semantic features with the plurality of candidate map semantic features; and determining optimal candidate positioning information of the vehicle and a matching pair corresponding to the optimal candidate positioning information.

12 Claims, 6 Drawing Sheets

(56) References Cited

U.S. PATENT DOCUMENTS

| | | | |
|---|---|---|---|
| 2019/0187703 A1 | 6/2019 | Millard et al. | |
| 2020/0089251 A1 | 3/2020 | Golestan Irani | |
| 2020/0202143 A1 | 6/2020 | Viswanathan | |
| 2022/0066002 A1* | 3/2022 | Abari | G01S 17/931 |

FOREIGN PATENT DOCUMENTS

| | | | | |
|---|---|---|---|---|
| CN | 107990899 A | 5/2018 | | |
| CN | 108225346 A | 6/2018 | | |
| CN | 108732582 A | 11/2018 | | |
| CN | 109145171 A | 1/2019 | | |
| CN | 109733383 A | 5/2019 | | |
| CN | 110807412 A | 2/2020 | | |
| CN | 110866079 A | 3/2020 | | |
| CN | 111323004 A | 6/2020 | | |
| CN | 111323029 A | 6/2020 | | |
| JP | 2020076711 A | 5/2020 | | |
| JP | 2020516853 A | 6/2020 | | |
| KR | 20190076815 A | 7/2019 | | |
| WO | WO-2021190167 A1 * | 9/2021 | | G01C 11/04 |

OTHER PUBLICATIONS

Machine Translation of CN_109733383_A (Year: 2019).*
Jie Jin, et al., Localization Based on Semantic Map and Visual Inertial Odometry, 24th International Conference on Pattern Recognition (ICPR), 2018, pp. 2410-2415.
Lukas Schaupp, et al., MOZARD: Multi-Modal Localization for Autonomous Vehicles in Urban Outdoor Environments, Arxiv.Org, Cornell University Library, 2020, 201 Olin Library Cornell University Ithaca.

* cited by examiner

|      | m1  | m2  | m3  | m4  | m5  |
|------|-----|-----|-----|-----|-----|
| m'1  | 0.5 | INF | INF | 0.8 | INF |
| m'2  | INF | 0.9 | 0.3 | INF | INF |
| m'3  | 0.1 | INF | 0.2 | INF | INF |
| m'4  | 0.2 | 0.8 | INF | 0.7 | INF |
| m'5  | INF | INF | INF | INF | 0.3 |

FIG. 7

|      | m1  | m2  | m3  | m4  | m5  |
|------|-----|-----|-----|-----|-----|
| m'1  | 1,3 | INF | INF | 2,2 | INF |
| m'2  | INF | 2,2 | 1,2 | INF | INF |
| m'3  | 1,1 | INF | 2,1 | INF | INF |
| m'4  | 1,2 | 3,1 | INF | 2,1 | INF |
| m'5  | INF | INF | INF | INF | 1,1 |

FIG. 8

|     | m1  | m2  | m3  | m4  | m5  |
| --- | --- | --- | --- | --- | --- |
| m'1 | INF | INF | INF | 1,2 | INF |
| m'2 | INF | 2,2 | 1,1 | INF | INF |
| m'3 | INF | INF | INF | INF | INF |
| m'4 | INF | 2,1 | INF | 1,1 | INF |
| m'5 | INF | INF | INF | INF | INF |

FIG. 9

MAP MATCHING METHOD AND APPARATUS, ELECTRONIC DEVICE AND STORAGE MEDIUM

CROSS REFERENCE TO THE RELATED APPLICATIONS

This application is the national phase entry of International Application No. PCT/CN2020/123162, filed on Oct. 23, 2020, which is based upon and claims priority to Chinese Patent Application No. 202011031457.0, filed on Sep. 27, 2020, the entire contents of which are incorporated herein by reference.

TECHNICAL FIELD

Embodiments of the present application relate to the field of intelligent driving technologies, and particularly to a map matching method and apparatus, an electronic device and a non-transient computer-readable storage medium.

BACKGROUND

In the field of intelligent driving technologies, vehicle positioning technology plays an important role in both aided driving and automated driving. At present, mainstream vehicle positioning technologies include a vslam (visual simultaneous localization and mapping) technology based on vision, a lslam (laser simultaneous localization and mapping) technology based on laser radar, and the like. According to these methods, it is usually necessary to build a dense positioning map in advance, and descriptors, intensity and other information for matching are stored, thus occupying a lot of storage resources.

In order to reduce the size of the positioning map and improve robustness in some scenes at the same time, positioning is realized on the basis of a vector semantic map in some positioning solutions. However, although the sparsity of the vector map greatly reduces the size thereof, the lack of descriptors and other information also challenges the way to achieve efficient and high-accuracy real-time matching.

The description of the discovery process of the above problems is only used to assist in understanding the technical solutions of the present application, and does not represent an admission that the above contents belong to the prior art.

SUMMARY

In order to solve at least one problem in the prior art, at least one embodiment of the present application provides a map matching method and apparatus, an electronic device and a non-transient computer-readable storage medium.

According to a first aspect, the embodiments of the present application provide a map matching method, wherein the method includes:
  acquiring initial positioning information of a vehicle and vehicle sensor data;
  determining a plurality of pieces of candidate positioning information on the basis of the initial positioning information;
  determining a plurality of observation semantic features on the basis of the vehicle sensor data;
  acquiring local map information on the basis of the initial positioning information, the local map information including a plurality of map semantic features;
  for each piece of candidate positioning information:
    converting the plurality of map semantic features into a coordinate system of the vehicle sensor on the basis of the candidate positioning information, so as to obtain a plurality of candidate map semantic features under the coordinate system; and
    matching the plurality of observation semantic features and the plurality of candidate map semantic features, so as to obtain matching pairs; and
  determining optimal candidate positioning information of the vehicle and a matching pair corresponding to the optimal candidate positioning information on the basis of the matching pairs corresponding to each piece of candidate positioning information.

According to a second aspect, the embodiments of the present application further provide a map matching apparatus, wherein the apparatus includes:
  an acquisition unit configured for acquiring initial positioning information of a vehicle and vehicle sensor data; and acquiring local map information on the basis of the initial positioning information, the local map information including a plurality of map semantic features;
  a first determining unit configured for determining a plurality of pieces of candidate positioning information on the basis of the initial positioning information; and determining a plurality of observation semantic features on the basis of the vehicle sensor data;
  a matching unit configured for, for each piece of candidate positioning information:
  converting the plurality of map semantic features into a coordinate system of the vehicle sensor on the basis of the candidate positioning information, so as to obtain a plurality of candidate map semantic features under the coordinate system; and
  matching the plurality of observation semantic features and the plurality of candidate map semantic features, so as to obtain matching pairs; and
  a second determining unit configured for determining optimal candidate positioning information of the vehicle and a matching pair corresponding to the optimal candidate positioning information on the basis of matching pairs corresponding to each piece of candidate positioning information.

According to a third aspect, the embodiments of the present application further provide an electronic device, including: a processor and a memory; the processor being configured for executing the steps of the map matching method according to the first aspect by calling a program or instruction stored in the memory.

According to a fourth aspect, the embodiments of the present application further provide a non-transient computer-readable storage medium for storing a program or instruction, wherein the program or instruction enables a computer to execute the steps of the map matching method according to the first aspect.

It can be seen that in at least one embodiment of the present application, the plurality of observation semantic features are determined on the basis of the vehicle sensor data, and the local map information (the local map information includes the plurality of map semantic features) is acquired on the basis of the initial positioning information of the vehicle and the plurality of pieces of candidate positioning information (including the initial positioning information) are determined; then, the plurality of observation semantic features are matched with the plurality of candidate map semantic features, so as to obtain the matching pairs; and therefore, the optimal candidate positioning information of the vehicle and the matching pair corresponding to the optimal candidate positioning information on the basis of the matching pairs corresponding to each piece of candidate positioning information are determined.

The embodiments of the present application are suitable for a vector semantic map, achieves real-time matching of observation features and map features by only using vector information (such as information of map semantic features) of the vector semantic map, does not depend on additional data such as additional descriptors and intensity, and achieves a good matching effect on the basis of reducing storage requirements and computing power use. In addition, the embodiments of the present application have no special requirements for sensor types (a camera, a laser radar, and the like, may be applicable).

BRIEF DESCRIPTION OF THE DRAWINGS

In order to more clearly illustrate the technical solutions of the embodiments of the present application or the prior art, the figures that are required to describe the embodiments or the prior art will be briefly introduced below. Apparently, the figures that are described below are some embodiments of the present application, and those of ordinary skills in the art can obtain other figures according to these figures without paying creative work.

FIG. 7 is an example diagram of a semantic-Euclidean distance matrix according to the embodiments of the present application;

FIG. 8 is an example diagram of a distance ranking matrix determined based on the semantic-Euclidean distance matrix shown in FIG. 7; and FIG. 9 is an example diagram of a matrix obtained after updating the distance ranking matrix shown in FIG. 8.

DETAILED DESCRIPTION OF THE EMBODIMENTS

In order to make the above objects, features and advantages of the present application be more clearly understood, the present application will be described in further detail below with reference to the drawings and embodiments. It can be understood that the described embodiments are part of the embodiments of the present application, rather than all of the embodiments. The specific embodiments described herein are merely illustrative of the present application, but are not intended to limit the present application. Based on the embodiments in the present application, all other embodiments obtained by those of ordinary skills in the art without going through any creative work shall fall within the scope of protection of the present application.

It should be noted that relational terms herein such as "first" and "second" are used merely to distinguish one entity or operation from another entity or operation, and do not necessarily require or imply there is any such relationship or order between these entities or operations.

Figure 1:
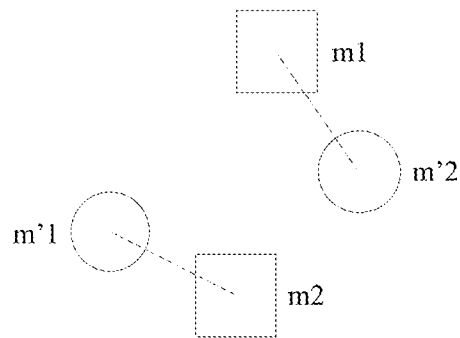
FIG. 1 is an exemplary scenario diagram of a matching problem according to the embodiments of the present application

In order to perform map matching in real time during an intelligent driving process, in conjunction with FIG. 1, the embodiments of the present application describe matching problems as follows:

In FIG. 1, a set M{m1, m2} and a set M'{m'1, m'2} are given, as many matching elements as possible are found in M' for elements in M under the constraint of minimum distance to form matching pairs, wherein each matching pair includes one element in M and one element in M'.

In FIG. 1, there are two matching pairs: (m1, m'2) and (m2, m'1). It will be appreciated that, since under the constraint of minimum distance, a distance between m1 and m'2 is less than a distance between m1 and m'1, and likewise, a distance between m2 and m'1 is less than a distance between m2 and m'2.

Based on the above description of the matching problems, the set M may be understood as a set of observation features and the set M' may be understood as a set of map features. In some embodiments, the observation feature may be a real-time observation feature, whether the observation feature or the map feature is a semantic feature, that is, the observation feature is an observation semantic feature, and the map feature is a map semantic feature.

The observation semantic features may be understood as an observation semantic feature of a determined target for positioning on the basis of vehicle sensor data, for example, the vehicle sensor data is image data, the image data is processed through a target detection algorithm, a category and a position of a target included in the image can be determined, and the target may be understood as an observation semantic feature. For example, the image includes lane lines, traffic markings (such as straight, left-turn, right-turn, and the like), traffic signals (i.e., traffic lights), traffic signs, and the like, which are observation semantic features of the target for positioning.

The map semantic feature may be understood as a semantic feature of a target included in a map (for example, vector map), for example, a lane line, a traffic marking, a traffic signal, a traffic sign and the like in a map, which are all map semantic features of the target for positioning. In some embodiments, in order to facilitate the acquisition of the map semantic features from the map, the map may be pre-processed such that the map includes information of the map semantic features, such as information related to the semantic features of the map, such as semantic labels and positions including map semantic features in the map, so as to obtain information of the map semantic features from the map while obtaining the map.

In map matching, the most matching pairs are found according to a certain constraint condition, and then map features corresponding to different observation features are determined, thereby providing a basis for subsequent vehicle positioning. It should be noted that in the map matching, the constraint condition includes not only the constraint of minimum distance, but also other constraint conditions, these constraint conditions jointly determine the determination of the matching pair, and the content included in the constraint conditions will be described in detail below.

Therefore, the embodiments of the present application provide a map matching solution, which determines a plurality of observation semantic features on the basis of the vehicle sensor data, and acquires local map information (the local map information includes a plurality of map semantic features) on the basis of initial positioning information of the vehicle and a plurality of pieces of candidate positioning information (including the initial positioning information); then, matches the plurality of observation semantic features with the plurality of candidate map semantic features for each piece of candidate positioning information, so as to obtain matching pairs; and therefore, determines optimal candidate positioning information of the vehicle and a matching pair corresponding to the optimal candidate positioning information on the basis of the matching pairs corresponding to each piece of candidate positioning information.

The embodiments of the present application are suitable for a vector semantic map, achieves real-time matching of observation features and map features by only using vector information (such as information of map semantic features) of the vector semantic map, does not depend on additional data such as additional descriptors and intensity, and achieves a good matching effect on the basis of reducing storage requirements and computing power use. In addition, the embodiments of the present application have no special requirements for sensor types (a camera, a laser radar, and the like, may be applicable).

In some embodiments, a semantic-Euclidean distance between the map semantic feature and the observation semantic feature may be determined, and then a distance matrix may be determined, so as to implement vector semantic map matching based on the distance matrix. In some embodiments, the distance matrix-based matching method is widely applicable to various matching scenarios that can define metric distances.

The embodiments of the present application may be applied to an intelligent driving vehicle, and may also be applied to an electronic device. The intelligent driving vehicle is a vehicle carrying different levels of intelligent driving systems, and the intelligent driving systems include, for example, an unmanned driving system, an aided driving system, a driving assistance system, a highly-automatic driving system, a full self-driving vehicle, and the like. The electronic device is installed with an intelligent driving system, for example, the electronic device may be used to test an intelligent driving algorithm, for another example, the electronic device may be an on-vehicle device, and in some embodiments, the electronic device may also be applied to other fields. It should be understood that the application scenarios of the embodiments of the present application are only examples or embodiments of the present application, and that it is also possible for those of ordinary skills in the art to apply the present application to other similar contexts without going through creative work. In order to be more clearly described below, in the embodiments of the present application, the intelligent driving vehicle is used as an example to describe a map matching method, a map matching apparatus, an electronic device, or a non-transient computer-readable storage medium.

Figure 2:
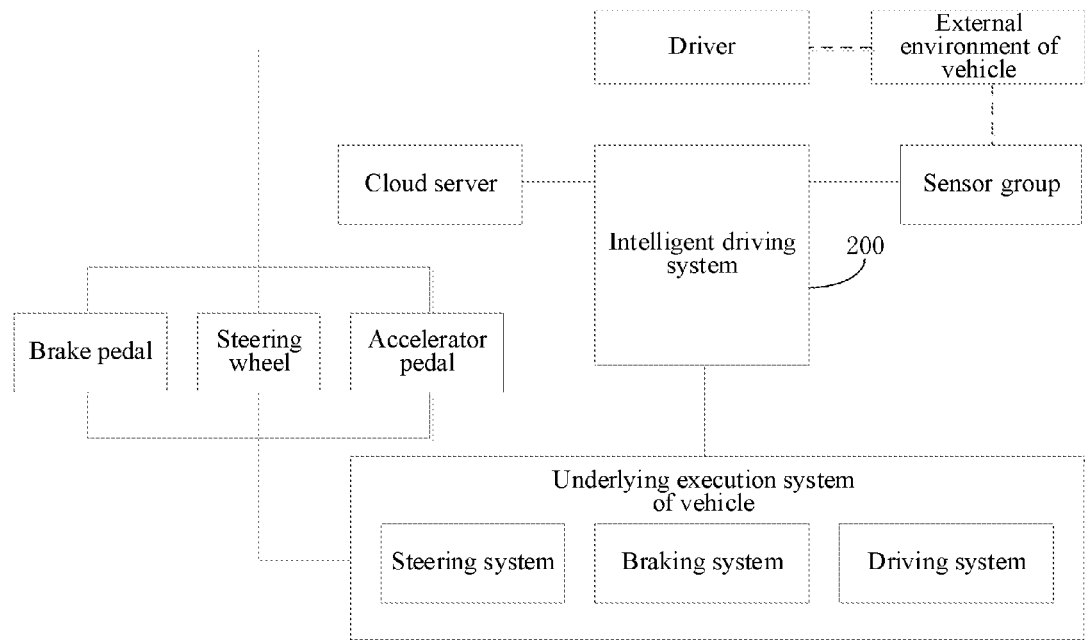
FIG. 2 is an exemplary architectural diagram of an intelligent driving vehicle according to the embodiments of the present application.

FIG. 2 is an exemplary architectural diagram of an intelligent driving vehicle according to the embodiments of the present application. As shown in FIG. 2, the intelligent driving vehicle includes: a sensor group, an intelligent driving system 200, an underlying execution system of the vehicle, and other components that may be used to drive the vehicle and control the operation of the vehicle, such as a brake pedal, a steering wheel, and an accelerator pedal.

The sensor group is used to collect data of an external environment of the vehicle and detect position data of the vehicle. The sensor group includes, but is not limited to, at least one of a camera, a lidar, a millimeter-wave radar, an ultrasonic radar, a GPS (Global Positioning System), and an IMU (Inertial Measurement Unit).

In some embodiments, the sensor group is also used for collecting kinetic data of the vehicle. For example, the sensor group further includes, but is not limited to, at least one of a wheel speed sensor, a speed sensor, an acceleration sensor, a steering wheel angle sensor and a front wheel angle sensor.

The intelligent driving system 200 is configured to acquire sensing data of the sensor group, wherein the sensing data includes, but is not limited to, an image, a video, a laser point cloud, a millimeter wave, GPS information, a vehicle state, and the like. In some embodiments, the intelligent driving system 200 performs environmental perception and vehicle positioning on the basis of the sensing data to generate perception information and a vehicle pose. The intelligent driving system 200 performs planning and decision on the basis of the perception information and the vehicle pose to generate planning and decision information. The intelligent driving system 200 generates a vehicle control instruction on the basis of the planning and decision information, and issues the vehicle control instruction to the underlying execution system of the vehicle.

In some embodiments, the intelligent driving system 200 may be a software system, a hardware system or a system combining hardware and software. For example, the intelligent driving system 200 is a software system running on an operating system, and an on-vehicle hardware system is a hardware system that supports the operation of the operating system.

In some embodiments, the intelligent driving system 200 may interact with a cloud server. In some embodiments, the intelligent driving system 200 interacts with the cloud server through a wireless communication network (for example, including, but not limited to a GPRS network, a Zigbee network, a Wifi network, a 3G network, a 4G network, a 5G network, and the like).

In some embodiments, the cloud server is used to interact with the vehicle. The cloud server may send environmental information, positioning information, control information, and other information required in the intelligent driving process of the vehicle to the vehicle. In some embodiments, the cloud server may receive the sensing data, the vehicle state information, the vehicle driving information, and the related information of the vehicle request from the vehicle end. In some embodiments, the cloud server may remotely control the vehicle based on user settings or vehicle requests. In some embodiments, the cloud server may be a server or a server group. The server group may be centralized or distributed. In some embodiments, the cloud server may be local or remote.

The underlying execution system of the vehicle is used to receive the vehicle control instruction and control the running of the vehicle on the basis of the vehicle control instruction. In some embodiments, the underlying execution system of the vehicle includes, but is not limited to: a steering system, a braking system and a driving system. In some embodiments, the underlying execution system of the vehicle may further include an underlying controller configured to parse the vehicle control instruction and issue the vehicle control instruction to corresponding systems such as the steering system, the braking system, and the driving system.

In some embodiments, the intelligent driving vehicle may also include a vehicle CAN bus, which is not shown in FIG. 1, and the vehicle CAN bus is connected with the underlying execution system of the vehicle. Information exchange between the intelligent driving system 200 and the underlying execution system of the vehicle is transmitted through the vehicle CAN bus.

Figure 3:
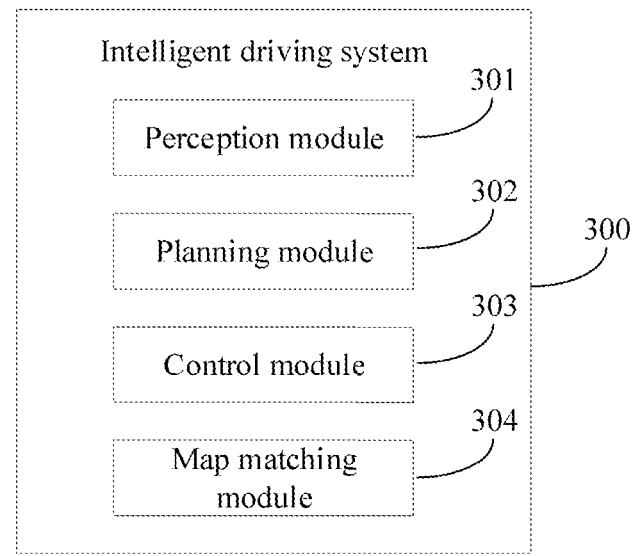
FIG. 3 is an exemplary block diagram of an intelligent driving system according to the embodiments of the present application.

FIG. 3 is an exemplary block diagram of an intelligent driving system 300 according to the embodiments of the present application. In some embodiments, the smart driving system 300 may be implemented as the intelligent driving system 200 in FIG. 2 or a part of the intelligent driving system 200, and is used to control the running of the vehicle.

As shown in FIG. 3, the intelligent driving system 300 may be divided into a plurality of modules, for example, may include: a perception module 301, a planning module 302, a control module 303, a map matching module 304 and some other modules used for intelligent driving.

The perception module 301 is used for environmental perception and positioning. In some embodiments, the perception module 301 is used to perform environmental perception and positioning on the basis of at least one of the acquired sensor data, V2X (Vehicle to X, vehicle wireless communication) data, high-precision maps and other data. The perception information may include, but is not limited to at least one of the following: obstacle information, a road sign/mark, pedestrian/vehicle information, and a drivable area. The positioning information includes a vehicle pose.

The planning module 302 is used to perform route planning and decision making. In some embodiments, the planning module 302 generates planning and decision information on the basis of the perception information and the positioning information generated by the perception module 301. In some embodiments, the planning module 302 is also used to generate planning and decision information with reference to at least one of the V2X data, the high-precision maps and other data. The planning information may include, but is not limited to planning route; and the decision making information may include, but is not limited to at least one of the following: behaviors (for example, including, but not limited to following, overtaking, parking, bypassing, and the like), vehicle heading, vehicle speed, expected acceleration of the vehicle, expected steering wheel angle, and the like.

The control module 303 is configured to generate a control instruction of the underlying execution system of the vehicle on the basis of the planning and decision information, and issue the control instruction to enable the underlying execution system of the vehicle to control the vehicle to run. The control may include, but is not limited to: steering of the steering wheel, a transverse control instruction, a longitudinal control instruction, and the like.

The map matching module 304 is configured for determining a plurality of observation semantic features on the basis of the vehicle sensor data, and acquiring local map information (the local map information includes a plurality of map semantic features) on the basis of initial positioning information of the vehicle and a plurality of pieces of candidate positioning information (including the initial positioning information); then, matching the plurality of observation semantic features with the plurality of candidate map semantic features for each piece of candidate positioning information, so as to obtain matching pairs; and therefore, determining optimal candidate positioning information of the vehicle and a matching pair corresponding to the optimal candidate positioning information on the basis of the matching pairs corresponding to each piece of candidate positioning information.

In some embodiments, functions of the map matching module 304 may be integrated into the perception module 301, the planning module 302 or the control module 303, or may also be configured as an independent module from the intelligent driving system 300. The map matching module 304 may be a software module, a hardware module or a module integrating software and hardware. For example, the map matching module 304 is a software system running on an operating system, and a vehicle-mounted hardware system is a hardware system that supports the operation of the operating system.

Figure 4:
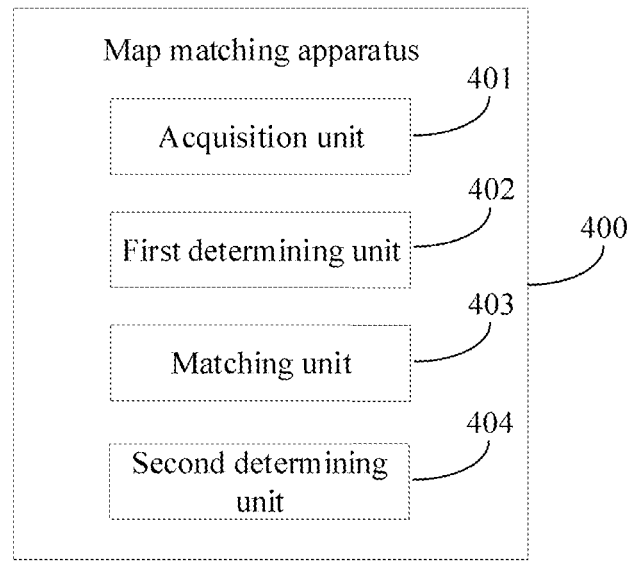
FIG. 4 is an exemplary block diagram of a map matching apparatus according to the embodiments of the present application.

FIG. 4 is an exemplary block diagram of a map matching apparatus 400 according to the embodiments of the present application. In some embodiments, the map matching apparatus 400 may be implemented as the map matching module 304 in FIG. 3 or a part of the map matching module 304.

As shown in FIG. 4, the map matching apparatus 400 may include, but is not limited to the following units: an acquisition unit 401, a first determining unit 402, a matching unit 403 and a second determining unit 404.

Acquisition Unit 401

The acquisition unit 401 is configured for acquiring related information of the vehicle, where the related information includes, for example, information including initial positioning information, vehicle sensor data, and the like, with a direct or indirect association relationship with the vehicle. The initial positioning information may be prior information from outside exterior of the vehicle, and may also be estimated from the second determining unit 404. The vehicle sensor data may be obtained by performing data interaction with the sensor installed on the vehicle.

In some embodiments, the acquisition unit 401 may acquire local map information on the basis of the initial positioning information. In some embodiments, the acquisition unit 401 may acquire the local map information from a pre-established vector semantic map on the basis of the initial positioning information, the local map information being a part of the vector semantic map. In some embodiments, the acquisition unit 401 may index the vector semantic map through a fast nearest neighbor algorithm on the basis of the initial positioning information to obtain the local map information.

The pre-established vector semantic map includes information of map semantic features, such as lane lines, traffic markings, traffic signals, traffic signs and the like, which are all map semantic features. The information of the map semantic features, for example, information related to the map semantic features, such as semantic labels and positions of the map semantic features.

In this embodiment, the acquisition unit 401 can acquire the information of the map semantic features from the local map information while acquiring the local map information, that is, can obtain the plurality of map semantic features included in the local map information.

First Determining Unit 402

The first determining unit 402 is configured for determining a plurality of pieces of candidate positioning information on the basis of the initial positioning information, the plurality of candidate positioning information including the initial positioning information. In this embodiment, considering that the initial positioning information generally has a large error, the map semantic features have strong sparsity, and if the initial positioning information is directly used for map matching, the matching accuracy is low or the effective matching features are few, so that a correct rate of subsequent map matching can be improved or a number of effective matching features can be increased by determining the plurality of pieces of candidate positioning information.

In some embodiments, the first determining unit 402 may perform discrete random sampling on a space within a certain range of the initial positioning information to obtain the plurality of pieces of candidate positioning information. In some embodiments, the first determining unit 402 generates n pieces of candidate positioning information including the initial positioning information according to a certain probability distribution within a certain spatial range r of the initial positioning information by means of Monte Carlo random sampling. The number n of the spatial range r and the number n of the candidate positioning information are both related to uncertainty of the initial positioning information, the higher the uncertainty of the initial positioning information, the greater the values of r and n.

In some embodiments, the first determining unit 402 may determine a plurality of observation semantic features on the basis of the vehicle sensor data, the plurality of observation semantic features being real-time observation semantic features. For example, the vehicle sensor data is image data, the first determining unit 402 processes the image data by using a target detection algorithm, a category and a position of a target included in the image may be determined, and the target may be understood as an observation semantic feature. For example, the image includes lane lines, traffic markings (such as straight, left-turn, right-turn, and the like), traffic signals (i.e., traffic lights), traffic signs, and the like, which are all observation semantic features. It is worth noting that the above examples of the sensor data are only used for illustration and are not used to limit the present application, and in practical application, the vehicle sensor data may be in any form (for example, laser radar data), as long as the observation semantic features can be identified from the sensor data.

Matching Unit 403

The matching unit 403 is configured for performing map matching for each piece of candidate positioning information. In some embodiments, the matching unit 403, for each piece of candidate positioning information: converts the plurality of map semantic features into a coordinate system of the vehicle sensor on the basis of the candidate positioning information, so as to obtain a plurality of candidate map semantic features under the coordinate system; and matches the plurality of observation semantic features with the plurality of candidate map semantic features, so as to obtain matching pairs. In some embodiments, the matching unit 403 also converts the plurality of observation semantic features into the coordinate system of the same vehicle sensor, and then matches the plurality of observation semantic features with the plurality of candidate map semantic features under the coordinate system converted to the same vehicle sensor to obtain the matching pairs.

In some embodiments, the matching unit 403 performs observability screening on each candidate map semantic feature, that is, determines whether the candidate map semantic feature is within a blind area of the vehicle sensor, and when the candidate map semantic feature is within the blind area of the vehicle sensor, determines that the candidate map semantic feature may not be matched with the observation semantic features, should be filtered out, and does not participate in subsequent matching.

In particular, the matching unit 403, for each piece of candidate positioning information: removes the candidate map semantic features in the blind area of the vehicle sensor after converting the plurality of map semantic features into the coordinate system of the vehicle sensor on the basis of the candidate positioning information, so as to obtain the plurality of candidate map semantic features under the coordinate system; then the observation semantic features are matched with the remaining candidate map semantic features, so as to obtain matching pairs.

In some embodiments, in order to improve the correct rate of map matching or increase the number of effective matching features, it is specified in this embodiment that the matching pairs satisfy the following condition 1 to condition 4:

Condition 1: the candidate map semantic feature is in one-to-one correspondence with the observation semantic feature matched therewith. That is, one candidate map semantic feature can be only matched with one observation semantic feature, and one observation semantic feature can be only matched with one candidate map semantic feature.

Condition 2: a semantic label of the candidate map semantic feature is the same as a semantic label of the observation semantic feature matched therewith.

Condition 3: a semantic-Euclidean distance between the candidate map semantic feature and the observation semantic feature matched therewith is less than or equal to a Euclidean distance threshold. The semantic-Euclidean distance is used for representing a similarity between one candidate map semantic feature and one observation semantic feature; and the Euclidean distance threshold is inversely correlated with a Euclidean distance between the candidate map semantic feature and the candidate positioning information. The Euclidean distance between the candidate map semantic feature and the candidate positioning information may be understood as the Euclidean distance between the position (coordinate value) corresponding to the candidate map semantic feature and the candidate positioning information (coordinate value).

In some embodiments, the Euclidean distance threshold is determined by the following formula:

$$th = th_0 \times f(t)$$

wherein, th is the Euclidean distance threshold, $th_0$ is a set fixed prior threshold, t is the Euclidean distance between the candidate map semantic feature and the candidate positioning information, and f(t) is a mapping function inversely correlated with t. The greater the Euclidean distance t between the candidate map semantic feature and the candidate positioning information (i.e., the farther the candidate map semantic feature from the candidate positioning information), the more likely it is to cause matching errors. Therefore, the smaller the Euclidean distance threshold th is, the higher the probability of correct matching.

Condition 4: the semantic-Euclidean distance between the candidate map semantic features and the observation semantic feature matched therewith is minimum among all semantic-Euclidean distances corresponding to the candidate map semantic features, and is minimum among all semantic-Euclidean distances corresponding to the observation semantic features. In some embodiments, one semantic-Euclidean distance is calculated for the candidate map semantic features and each observation semantic feature. In some embodiments, a certain semantic-Euclidean distance is minimum in the plurality of semantic-Euclidean distances corresponding to the candidate semantic feature, but is not the minimum in the plurality of semantic-Euclidean distances corresponding to the observation semantic features, and then the two are not matching pairs.

In some embodiments, the matching pairs also need to satisfy the following condition 5:

Condition 5: when the candidate map semantic feature has a superior semantic feature, a semantic label of the superior semantic feature of the candidate map semantic feature is the same as a semantic label of a superior semantic feature of the observation semantic feature matched therewith. In some embodiments, a semantic-Euclidean distance between the superior semantic feature of the candidate map semantic feature and the superior semantic feature of the observation semantic feature matched therewith is less than or equal to the Euclidean distance threshold.

In some embodiments, the superior semantic feature characterizes overall information of the target for positioning, and a subordinate semantic feature characterizes local or endpoint of the target for positioning. For example, the superior semantic feature is a lane line, and the subordinate semantic feature is an endpoint of the lane line.

The purpose of setting the condition 5 is to reduce the probability of matching errors, for example, to reduce the probability that an endpoint similar to a certain lane line matches an endpoint of another lane line.

It should be noted that some matching algorithms, such as nearest neighbor matching or violent matching, cannot satisfy the above conditions 1 to 5.

In some embodiments, the matching unit 403 determines a semantic-Euclidean distance between any candidate map semantic feature and any observation semantic feature through the following modes:

when a semantic label of the observation semantic feature is different from a semantic label of the candidate map semantic feature, the semantic-Euclidean distance is an invalid value INF;

when the semantic label of the observation semantic feature is the same as the semantic label of the candidate map semantic feature:

a Euclidean distance between a coordinate value corresponding to the observation semantic feature and a coordinate value corresponding to the candidate map semantic feature and a Euclidean distance threshold are determined;

when the Euclidean distance between the coordinate value corresponding to the observation semantic feature and the coordinate value corresponding to the candidate map semantic feature is less than or equal to the Euclidean distance threshold, the semantic-Euclidean distance is the Euclidean distance between the coordinate value corresponding to the observation semantic feature and the coordinate value corresponding to the candidate map semantic feature; and when the Euclidean distance between the coordinate value corresponding to the observation semantic feature and the coordinate value corresponding to the candidate map semantic feature is greater than the Euclidean distance threshold, the semantic-Euclidean distance is the invalid value INF.

In some embodiments, the Euclidean distance threshold is determined by the following formula:

$$\begin{cases} d = INF & \text{label} \neq \text{label}' \\ \begin{cases} d = de & d <= th \\ d = INF & d > th \end{cases} & \text{label} = \text{label}' \end{cases}$$

wherein d is the semantic-Euclidean distance; INF is an infinite value (i.e., invalid value); th is the Euclidean distance threshold; de=f(m, m'), f(m, m') is an Euclidean distance calculation function, and a specific form thereof is related to a geometric morphology of m and m', for example, the distance measurement from a point to a point, and the distance measurement from a line to a line are different, but all can obtain an Euler distance value. m is the observation semantic feature, m' is the candidate map semantic feature, label is the semantic label of the observation semantic feature, and label' is the semantic label of the candidate map semantic feature.

In some embodiments, in order to satisfy the condition 5, when the semantic label of the observation semantic feature is the same as the semantic label of the candidate map semantic feature, and the observation semantic feature or the candidate map semantic feature has the superior semantic feature, it is judged whether the semantic label of the superior semantic feature of the observation semantic feature is the same as the semantic label of the candidate map semantic feature, and when the semantic label of the superior semantic feature of the observation semantic feature is not the same as the semantic label of the candidate map semantic feature, it is determined that the semantic-Euclidean distance between the observation semantic feature and the map semantic feature is the invalid value INF.

In some embodiments, the matching unit 403 may determine a semantic-Euclidean distance matrix composed of the plurality of observation semantic features and the plurality of candidate map semantic features. In the semantic-Euclidean distance matrix shown in FIG. 7, m1, m2, m3, m4 and m5 are observation semantic features, while m'1, m'2, m'3, m'4 and m'5 are candidate map semantic features. In FIG. 7, a semantic-Euclidean distance between m1 and m'1 is 0.5, and a semantic-Euclidean distance between m1 and m'2 is INF; and a semantic-Euclidean distance between m1 and m'3 is 0.1. It can be seen that each element in the semantic-Euclidean distance matrix shown in FIG. 7 represents a semantic-Euclidean distance. In some embodiments, there is an invalid value INF in the semantic-Euclidean distance matrix shown in FIG. 7, and therefore, the semantic-Euclidean distance matrix is a sparse matrix, which does not need to store the invalid value INF, but only needs to store an effective value, thereby improving subsequent matching efficiency.

In some embodiments, the matching unit 403 may determine a distance ranking matrix on the basis of the semantic-Euclidean distance matrix, each element in the distance ranking matrix being a 2-tuple, and the 2-tuple representing ranking of rows and columns on which the semantic-Euclidean distance is located, wherein the smaller the distance is, the smaller the ranking value is, and the ranking value of 1 represents the closest distance. The distance ranking matrix as shown in FIG. 8 is a distance ranking matrix determined on the basis of the semantic-Euclidean distance matrix shown in FIG. 7. For example, in FIG. 7, since the ranking of rows and columns on which the semantic-Euclidean distance is located between m1 and m'1 are 1 and 3 respectively, the value of elements corresponding to m1 and m'1 in FIG. are (1,3).

In some embodiments, the matching unit 403 may determine the observation semantic features and the candidate map semantic features corresponding to a 2-tuple of (1, 1) in the distance ranking matrix as the matching pair as a matching pair. For example, in FIG. 8, m1 and m'3 are determined as the matching pair, while m5 and m'5 are also determined as the matching pair.

In some embodiments, after the determining the observation semantic feature and the candidate map semantic feature corresponding to the 2-tuple of (1, 1) in the distance ranking matrix as the matching pair, the matching unit 403 modifies all elements of rows and columns corresponding to the 2-tuple of (1, 1) into the invalid value INF, and updates the distance ranking matrix.

FIG. 9 is an example diagram of a matrix obtained after updating the distance ranking matrix shown in FIG. 8. In order to satisfy the condition 1, all elements of rows and columns corresponding to the 2-tuple of (1, 1) in FIG. 8 are modified to the invalid value INF, and the elements modified as INF make values of the elements in the same row and column thereof change to form a new matrix as shown in FIG. 9. It should be noted that the modification to the invalid value INF is merely an intermediate operation of updating the distance ranking matrix, and does not represent that the semantic-Euclidean distance is the invalid value INF.

In some embodiments, the matching unit 403 may determine the observation semantic feature and the candidate map semantic feature corresponding to the 2-tuple of (1, 1) in the updated distance ranking matrix as the matching pair. For example, in FIG. 9, m3 and m'2, and m4 and m'4 are also determined as the matching pairs.

The matching unit 403 may repeatedly update the distance ranking matrix and determine the matching pair until no 2-tuple of (1, 1) is present in the updated distance ranking matrix.

In some embodiments, in any matching scenario, as long as the measurement distance is defined, the distance matrix may be constructed, and then matching is performed to obtain the matching result. Therefore, the matching manner based on the distance matrix provided in the embodiments of the present application has wide applicability.

Second Determining Unit 404

The second determining unit 404 is configured for determining the optimal candidate positioning information of the vehicle and the matching pair corresponding to the optimal candidate positioning information on the basis of the matching pairs corresponding to each piece of candidate positioning information. In some embodiments, the optimal candidate positioning information may be used as the initial positioning information, so as to perform map matching on the observation semantic features obtained in real time.

In some embodiments, the second determining unit 404 selects candidate positioning information with the maximum number of matching pairs as the optimal candidate positioning information of the vehicle.

In some embodiments, the second determining unit 404 may determine an evaluation value of each piece of candidate positioning information on the basis of prior contribution degrees of different candidate map semantic features to vehicle positioning and the matching pairs corresponding to each piece of candidate positioning information. The prior contribution degree may be pre-configured, for example, the contribution of ground semantic feature such as lane lines, and the like, to vehicle positioning is greater than that of non-ground features, such as a guideboard, and the like. Therefore, the prior contribution degree of the lane line may be set to be higher than the prior contribution degree of the road sign.

In some embodiments, the evaluation value of the candidate positioning information is determined by the following formula:

$$score = \lambda_c \Sigma c_i + \lambda_d \Sigma f(d_i)$$

wherein, score is the evaluation value of the candidate positioning information; $\lambda_c$ and $\lambda_d$ are prior distribution weights, the specific values of which are not defined in this embodiment; $c_i$ is a prior contribution degree of the candidate map semantic feature in an $i^{th}$ matching pair to vehicle positioning; $d_i$ is a semantic-Euclidean distance of the $i^{th}$ matching pair; and $f(d_i)$ is a mapping function inversely correlated with $d_i$, that is, the smaller the $d_i$, the greater the $f(d_i)$.

In some embodiments, the second determining unit 404 may select candidate positioning information with the maximum evaluation value as the optimal candidate positioning information of the vehicle.

In some embodiments, after selecting the candidate positioning information with the maximum evaluation value, the second determining unit 404 judges whether the maximum evaluation value is less than an evaluation value threshold, and when the maximum evaluation value is less than the evaluation value threshold, it is determined that the map matching is failed. The evaluation value threshold is a priori value, that is, a predetermined value, the specific value of which is not defined in this embodiment, and a person skilled in the art can set the evaluation value threshold according to actual needs.

In some embodiments, the division of each unit in the map matching apparatus 400 is only a logical function division, and there may be other division modes in actual implementation. For example, the acquisition unit 401, the first determining unit 402, the matching unit 403 and the second determining unit 404 may be realized as one unit; the acquisition unit 401, the first determining unit 402, the matching unit 403 or the second determining unit 404 may also be divided into a plurality of subunits. It may be understood that each system or subsystem can be realized by electronic hardware or a combination of computer software and electronic hardware. Whether the functions are executed by hardware or software depends on particular applications and design constraint conditions of the technical solutions. Those skilled in the art can use different methods for each specific application to realize the described functions.

Figure 5:
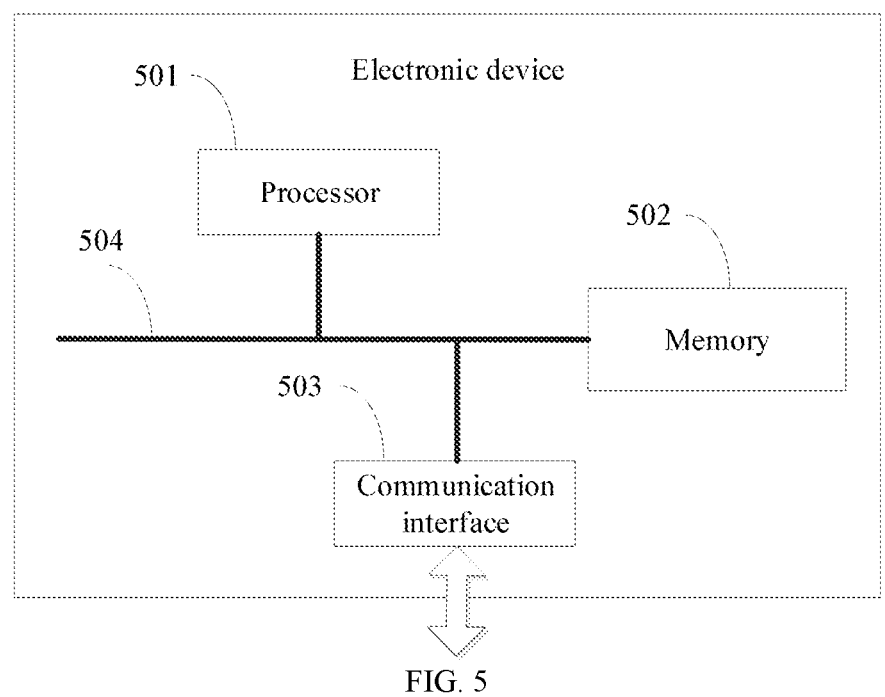
FIG. 5 is an exemplary block diagram of an electronic device according to the embodiments of the present application.

FIG. 5 is a structural schematic diagram of an electronic device provided by the embodiments of the present application.

As shown in FIG. 5, the electronic device includes: at least one processor 501, at least one memory 502 and at least one communication interface 503. Various components in the electronic device are coupled together through a bus system 504. The communication interface 503 is used for information transfer with external devices. It can be understood that the bus system 504 is configured to realize communications between these components. The bus system 504 includes a power bus, a control bus, and a status signal bus in addition to a data bus. However, for the sake of clarity, various buses are designated as the bus system 504 in FIG. 5.

It can be understood that the memory 502 in this embodiment may be a volatile memory or a non-volatile memory, or may include both volatile and non-volatile memories.

In some embodiments, the memory 502 is stored with the following elements, executable modules or data structures, or subsets thereof, or their extensions: an operating system and an application program.

The operating system includes various system programs, such as a framework layer, a core library layer, a driver layer, etc., which are used to realize various basic services and handle hardware-based tasks. The application programs including various application programs, such as Media Player, Browser, etc. are used to implement various application tasks. The program for implementing the map matching method of the embodiments of the present application may be included in the application program.

In the embodiment of the present application, the processor 501 is used to execute the steps of each embodiment of the map matching method provided by the embodiments of the present application by calling a program or instruction stored in the memory 502, specifically, a program or instruction stored in the application program.

The map matching method provided in the embodiments of the present application may be applied to a processor 501 or implemented by the processor 501. The processor 501 may be an integrated circuit chip with a signal processing capacity. In an implementation process, the steps in the foregoing methods may be completed using an integrated logic circuit of hardware in the processor 501 or an instruction in a form of software. The processor 501 may be a general-purpose processor, a Digital Signal Processor (DSP), an Application Specific Integrated Circuit (ASIC), a Field Programmable Gate Array (FPGA) or other programmable logic device, discrete gate or transistor logic device, and discrete hardware component. The general-purpose processor may be a microprocessor or the processor may be any conventional processor, or the like.

Steps of the map matching method provided by the embodiments of the present application may be directly executed and accomplished by means of a hardware decoding processor or may be executed and accomplished using a combination of hardware and software modules in the decoding processor. The software unit may be located in a mature storage medium in the art, such as a random access memory, a flash memory, a read-only memory, a programmable read-only memory, or an electrically erasable programmable memory, a register, and the like. The storage medium is located in the memory 502. The processor 501 reads information from the memory 502 and completes the steps of the foregoing method in combination with the hardware of the processor.

Figure 6:
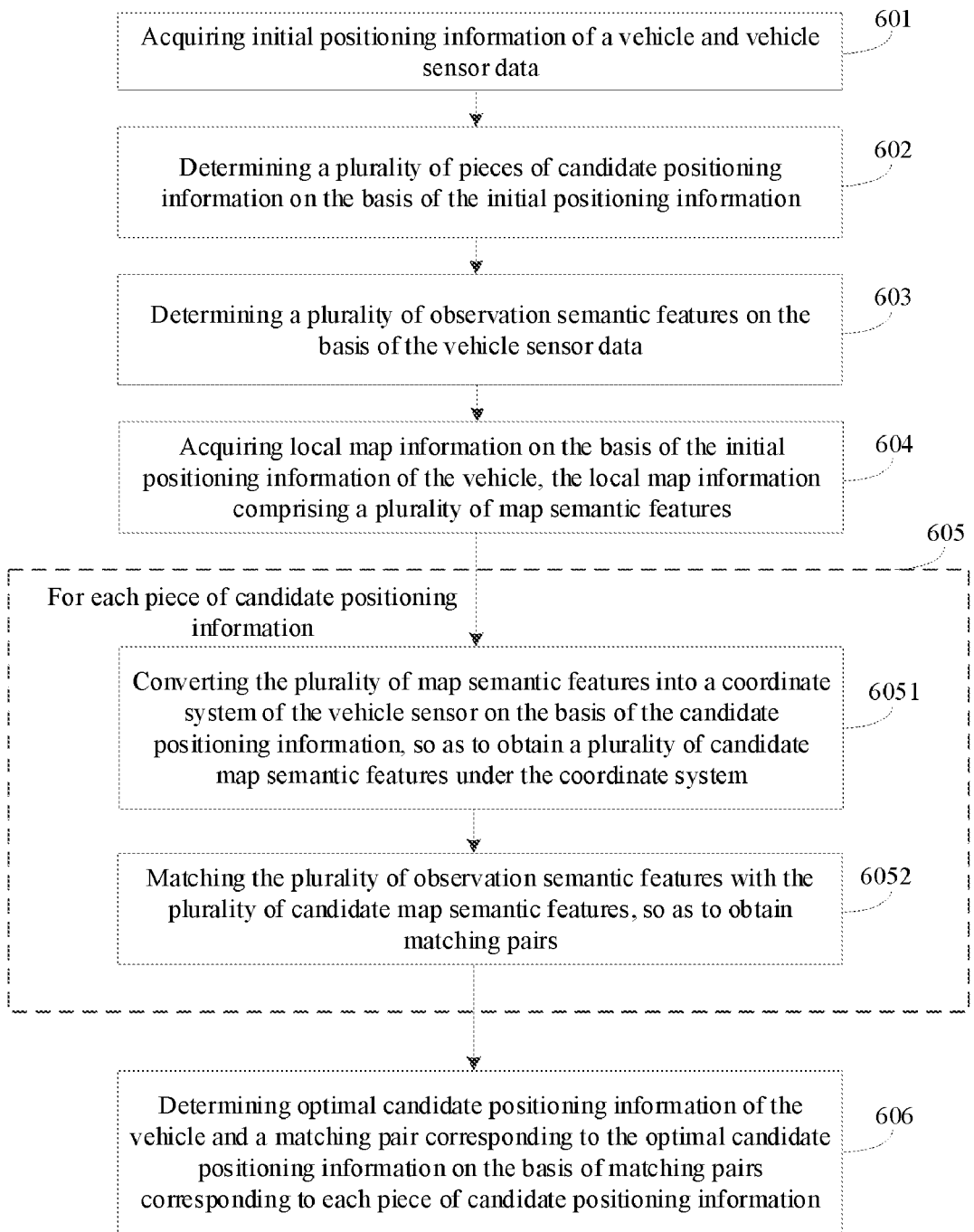
FIG. 6 is an exemplary flowchart of a map matching method according to the embodiments of the present application.

FIG. 6 is an exemplary flowchart of a map matching method provided by the embodiments of the present application. An executing body of the method is an electronic device, and in some embodiments, the executing body of the method may also be an intelligent driving system supported by an on-vehicle device. For ease of description, in the following embodiments, the electronic device is used as an executing body to describe the flow of the map matching method.

As shown in FIG. 6, in step 601, the electronic device acquires initial positioning information of a vehicle and vehicle sensor data.

In step 602, the electronic device determines a plurality of pieces of candidate positioning information on the basis of the initial positioning information.

In step 603, the electronic device determines a plurality of observation semantic features on the basis of the vehicle sensor data.

In step 604, the electronic device acquires local map information on the basis of the initial positioning information, the local map information including a plurality of map semantic features.

In step 605, the electronic device, for each piece of candidate positioning information:
  6051: converts the plurality of map semantic features into a coordinate system of the vehicle sensor on the basis of the candidate positioning information, so as to obtain a plurality of candidate map semantic features under the coordinate system; and
  6052: matches the plurality of observation semantic features with the plurality of candidate map semantic features, so as to obtain matching pairs.

In step 606, the electronic device determines optimal candidate positioning information of the vehicle and a matching pair corresponding to the optimal candidate positioning information on the basis of the matching pairs corresponding to each piece of candidate positioning information.

In some embodiments, before matching the plurality of observation semantic features with the plurality of candidate map semantic features, the method further includes:
  removing candidate map semantic features in a blind area of the vehicle sensor.

In some embodiments, the matching pairs satisfy the following condition 1 to condition 4:
  Condition 1: the candidate map semantic feature is in one-to-one correspondence with the observation semantic feature matched therewith. That is, one candidate map semantic feature can be only matched with one observation semantic feature, and one observation semantic feature can be only matched with one candidate map semantic feature.
  Condition 2: a semantic label of the candidate map semantic feature is the same as a semantic label of the observation semantic feature matched therewith.
  Condition 3: a semantic-Euclidean distance between the candidate map semantic feature and the observation semantic feature matched therewith is less than or equal to a Euclidean distance threshold. The semantic-Euclidean distance is used for representing a similarity between one candidate map semantic feature and one observation semantic feature; and the Euclidean distance threshold is inversely correlated with a Euclidean distance between the candidate map semantic feature and the candidate positioning information.
  Condition 4: the semantic-Euclidean distance between the candidate map semantic features and the observation semantic feature matched therewith is minimum among all semantic-Euclidean distances corresponding to the candidate map semantic features, and is minimum among all semantic-Euclidean distances corresponding to the observation semantic features.

In some embodiments, the matching pairs also satisfy the following condition 5:
  Condition 5: when the candidate map semantic feature has a superior semantic feature, a semantic label of the superior semantic feature of the candidate map semantic feature is the same as a semantic label of a superior semantic feature of the observation semantic feature matched therewith.

In some embodiments, a semantic-Euclidean distance between the superior semantic feature of the candidate map semantic feature and the superior semantic feature of the observation semantic feature matched therewith is less than or equal to the Euclidean distance threshold.

In some embodiments, a semantic-Euclidean distance between any candidate map semantic feature and any observation semantic feature is determined by the following modes:
  when a semantic label of the observation semantic feature is different from a semantic label of the candidate map semantic feature, the semantic-Euclidean distance is an invalid value INF;

when the semantic label of the observation semantic feature is the same as the semantic label of the candidate map semantic feature:
a Euclidean distance between a coordinate value corresponding to the observation semantic feature and a coordinate value corresponding to the candidate map semantic feature and a Euclidean distance threshold are determined;
when the Euclidean distance between the coordinate value corresponding to the observation semantic feature and the coordinate value corresponding to the candidate map semantic feature is less than or equal to the Euclidean distance threshold, the semantic-Euclidean distance is the Euclidean distance between the coordinate value corresponding to the observation semantic feature and the coordinate value corresponding to the candidate map semantic feature; and
when the Euclidean distance between the coordinate value corresponding to the observation semantic feature and the coordinate value corresponding to the candidate map semantic feature is greater than the Euclidean distance threshold, the semantic-Euclidean distance is the invalid value INF.

In some embodiments, the Euclidean distance threshold is determined by the following formula:

$$th = th_0 \times f(t)$$

wherein, th is the Euclidean distance threshold, $th_0$ is a set fixed prior threshold, t is the Euclidean distance between the candidate map semantic feature and the candidate positioning information, and f(t) is a mapping function inversely correlated with t.

In some embodiments, when the semantic label of the observation semantic feature is the same as the semantic label of the candidate map semantic feature, and the observation semantic feature or the candidate map semantic feature has the superior semantic feature, it is judged whether the semantic label of the superior semantic feature of the observation semantic feature is the same as the semantic label of the candidate map semantic feature, and when the semantic label of the superior semantic feature of the observation semantic feature is not the same as the semantic label of the candidate map semantic feature, it is determined that the semantic-Euclidean distance between the observation semantic feature and the map semantic feature is the invalid value INF.

In some embodiments, the matching the plurality of observation semantic features with the plurality of candidate map semantic features, so as to obtain the matching pairs, includes:
determining a semantic-Euclidean distance matrix composed of the plurality of observation semantic features and the plurality of candidate map semantic features;
determining a distance ranking matrix on the basis of the semantic-Euclidean distance matrix; each element in the distance ranking matrix being a 2-tuple, and the 2-tuple representing ranking of rows and columns on which the semantic-Euclidean distance is located; and
determining the observation semantic feature and the candidate map semantic feature corresponding to a 2-tuple of (1, 1) in the distance ranking matrix as the matching pair.

In some embodiments, after the determining the observation semantic feature and the candidate map semantic feature corresponding to the 2-tuple of (1, 1) in the distance ranking matrix as the matching pair, the method further includes:

modifying all elements of rows and columns corresponding to the 2-tuple of (1, 1) into the invalid value INF, and updating the distance ranking matrix;
determining the observation semantic feature and the candidate map semantic feature corresponding to the 2-tuple of (1, 1) in the updated distance ranking matrix as the matching pair; and
repeatedly executing the above two steps until no 2-tuple of (1, 1) is present in the updated distance ranking matrix.

In some embodiments, the determining the optimal candidate positioning information of the vehicle and the matching pair corresponding to the optimal candidate positioning information on the basis of the matching pairs corresponding to each piece of candidate positioning information, includes:
selecting candidate positioning information with the maximum number of matching pairs as the optimal candidate positioning information of the vehicle.

In some embodiments, the determining the optimal candidate positioning information of the vehicle and the matching pair corresponding to the optimal candidate positioning information on the basis of the matching pairs corresponding to each piece of candidate positioning information, includes:
determining an evaluation value of each piece of candidate positioning information on the basis of prior contribution degrees of different candidate map semantic features to vehicle positioning and the matching pairs corresponding to each piece of candidate positioning information; and
selecting candidate positioning information with the maximum evaluation value as the optimal candidate positioning information of the vehicle.

In some embodiments, the evaluation value of the candidate positioning information is determined by the following formula:

$$score = \lambda_c \Sigma c_i + \lambda_d \Sigma f(d_i)$$

wherein, score is the evaluation value of the candidate positioning information, $\lambda_c$ and $\lambda_d$ are prior distribution weights, $c_i$ is a prior contribution degree of the candidate map semantic feature in an $i^{th}$ matching pair to vehicle positioning, $d_i$ is a semantic-Euclidean distance of the $i^{th}$ matching pair, and $f(d_i)$ is a mapping function inversely correlated with $d_i$.

In some embodiments, after selecting the candidate positioning information with the maximum evaluation value, the method further includes:
judging whether the maximum evaluation value is less than an evaluation value threshold, and when the maximum evaluation value is less than the evaluation value threshold, it is determined that the map matching is failed.

It should be noted that, for the sake of simple description, all the foregoing method embodiments are all expressed as a series of action combinations, but those skilled in the art should understand that the embodiments of the present application are not limited by the described action sequences, because certain steps may be performed in other sequences or concurrently according to the embodiments of the present application. Moreover, those skilled in the art can understand that the embodiments described in the specification are all optional embodiments.

The embodiments of the present application also provide a non-transient computer-readable storage medium, which stores programs or instructions, and the programs or instructions cause a computer to execute the steps of the various embodiments of the map matching method, which will not be repeated here to avoid repeated descriptions.

It should be noted that the terms "including" or any variations thereof are intended to embrace a non-exclusive inclusion, such that a process, a method, an article, or an apparatus including a series of elements, includes not only those elements but also includes other elements not expressly listed, or also incudes elements inherent to such process, method, article, or apparatus. In the absence of further limitation, an element defined by the phrase "including . . . " does not exclude the existence of additional identical elements in the process, method, article, or apparatus that includes the element.

Those skilled in the art can understand that although some embodiments described herein include some features included in other embodiments rather than other features, but combinations of features of different embodiments are meant to be within the scope of the present application and form different embodiments.

Those skilled in the art can understand that the description of each embodiment has its own emphasis. For parts not detailed in one embodiment, please refer to the related description of other embodiments.

Although the embodiments of the present application have been described with reference to the drawings, those skilled in the art can make various modifications and variations without departing from the spirit and scope of the present application, and such modifications and variations all fall within the scope defined by the appended claims.

INDUSTRIAL APPLICABILITY

The embodiments of the present application are suitable for a vector semantic map, achieves real-time matching of observation features and map features by only using vector information (such as information of map semantic features) of the vector semantic map, does not depend on additional data such as additional descriptors and intensity, and achieves a good matching effect on the basis of reducing storage requirements and computing power use. In addition, the embodiments of the present application have no special requirements for sensor types (a camera, a laser radar, or the like, may be applicable). The present application has industrial applicability.

What is claimed is:

1. A vehicle positioning method, comprising:
acquiring initial positioning information of a vehicle;
sensing, with a vehicle sensor, environmental aspects of the vehicle as vehicle sensor data;
determining a plurality of pieces of candidate positioning information based on the initial positioning information;
determining a plurality of observation semantic features based on the vehicle sensor data;
acquiring local map information based on the initial positioning information, wherein the local map information comprises a plurality of map semantic features;
for each piece of candidate positioning information:
converting the plurality of map semantic features into a coordinate system of the vehicle sensor based on the candidate positioning information to obtain a plurality of candidate map semantic features under the coordinate system; and
matching the plurality of observation semantic features with the plurality of candidate map semantic features to obtain matching pairs, wherein the matching pairs satisfy that: when the candidate map semantic feature has a superior semantic feature, a semantic-Euclidean distance between the superior semantic feature of the candidate map semantic feature and a superior semantic feature of the observation semantic feature matched with the candidate map semantic feature is less than or equal to a Euclidean distance threshold;
determining optimal candidate positioning information of the vehicle and a matching pair corresponding to the optimal candidate positioning information based on the matching pairs corresponding to each piece of candidate positioning information,
positioning the vehicle, by a processor, based on the optimal candidate positioning information; and
driving, by an intelligent driving system of the vehicle, the vehicle by steering the vehicle based on the optimal candidate positioning information,
wherein the matching pairs further satisfy the following conditions:
the candidate map semantic feature is in one-to-one correspondence with the observation semantic feature matched with the candidate map semantic feature;
a semantic label of the candidate map semantic feature is the same as a semantic label of the observation semantic feature matched with the candidate map semantic feature;
a semantic-Euclidean distance between the candidate map semantic feature and the observation semantic feature matched with the candidate map semantic feature is less than or equal to the Euclidean distance threshold;
the semantic-Euclidean distance is configured for representing a similarity between one candidate map semantic feature and one observation semantic feature; and the Euclidean distance threshold is inversely correlated with a Euclidean distance between the candidate map semantic feature and the candidate positioning information; and
the semantic-Euclidean distance between the candidate map semantic feature and the observation semantic feature matched with the candidate map semantic feature is the smallest among semantic-Euclidean distances corresponding to the candidate map semantic feature, and is the smallest among semantic-Euclidean distances corresponding to the observation semantic feature.

2. The vehicle positioning method according to claim 1, wherein, before the matching the plurality of observation semantic features with the plurality of candidate map semantic features, the vehicle positioning method further comprises: removing candidate map semantic features in a blind area of the vehicle sensor.

3. The vehicle positioning method according to claim 1, wherein the matching pairs further satisfy the following conditions:
when the candidate map semantic feature has the superior semantic feature, a semantic label of the superior semantic feature of the candidate map semantic feature is the same as a semantic label of the superior semantic feature of the observation semantic feature matched with the candidate map semantic feature.

4. The vehicle positioning method according to claim 1, wherein a semantic-Euclidean distance between any candidate map semantic feature and any observation semantic feature is determined by the following modes:
when the semantic label of the observation semantic feature is different from the semantic label of the candidate map semantic feature, the semantic-Euclidean distance is an invalid value INF;
when the semantic label of the observation semantic feature is the same as the semantic label of the candidate map semantic feature:
a Euclidean distance between a coordinate value corresponding to the observation semantic feature and a coordinate value corresponding to the candidate map semantic feature and the Euclidean distance threshold are determined;
when the Euclidean distance between the coordinate value corresponding to the observation semantic feature and the coordinate value corresponding to the candidate map semantic feature is less than or equal to the Euclidean distance threshold, the semantic-Euclidean distance is the Euclidean distance between the coordinate value corresponding to the observation semantic feature and the coordinate value corresponding to the candidate map semantic feature; and
when the Euclidean distance between the coordinate value corresponding to the observation semantic feature and the coordinate value corresponding to the candidate map semantic feature is greater than the Euclidean distance threshold, the semantic-Euclidean distance is the invalid value INF.

5. The vehicle positioning method according to claim 4, wherein when the semantic label of the observation semantic feature is the same as the semantic label of the candidate map semantic feature, and the observation semantic feature or the candidate map semantic feature has the superior semantic feature, it is judged whether a semantic label of the superior semantic feature of the observation semantic feature is the same as the semantic label of the candidate map semantic feature, and when the semantic label of the superior semantic feature of the observation semantic feature is not the same as the semantic label of the candidate map semantic feature, it is determined that the semantic-Euclidean distance between the observation semantic feature and the candidate map semantic feature is the invalid value INF.

6. The vehicle positioning method according to claim 1, wherein the Euclidean distance threshold is determined by the following formula:

$$th = th_0 \times f(t)$$

wherein, th is the Euclidean distance threshold, $th_0$ is a set fixed prior threshold, t is the Euclidean distance between the candidate map semantic feature and the candidate positioning information, and f(t) is a mapping function inversely correlated with t.

7. The vehicle positioning method according to claim 1, wherein the matching the plurality of observation semantic features with the plurality of candidate map semantic features to obtain the matching pairs comprises:
determining a semantic-Euclidean distance matrix composed of the plurality of observation semantic features and the plurality of candidate map semantic features;
determining a distance ranking matrix based on the semantic-Euclidean distance matrix, wherein each element in the distance ranking matrix is a 2-tuple, and the 2-tuple represents a ranking of rows and columns, wherein the semantic-Euclidean distance is located on the rows and columns; and
determining the observation semantic feature and the candidate map semantic feature corresponding to a 2-tuple of (1, 1) in the distance ranking matrix as the matching pair.

8. The vehicle positioning method according to claim 7, wherein after the determining the observation semantic feature and the candidate map semantic feature corresponding to the 2-tuple of (1, 1) in the distance ranking matrix as the matching pair, the vehicle positioning method further comprises:
1) modifying elements of the rows and columns corresponding to the 2-tuple of (1, 1) into the invalid value INF, and updating the distance ranking matrix to obtain an updated distance ranking matrix;
2) determining the observation semantic feature and the candidate map semantic feature corresponding to the 2-tuple of (1, 1) in the updated distance ranking matrix as the matching pair; and
3) repeatedly executing steps 1) and 2) until no 2-tuple of (1, 1) is present in the updated distance ranking matrix.

9. The vehicle positioning method according to claim 1, wherein the determining the optimal candidate positioning information of the vehicle and the matching pair corresponding to the optimal candidate positioning information based on the matching pairs corresponding to each piece of candidate positioning information comprises:
selecting candidate positioning information with a maximum number of the matching pairs as the optimal candidate positioning information of the vehicle.

10. The vehicle positioning method according to claim 1, wherein the determining the optimal candidate positioning information of the vehicle and the matching pair corresponding to the optimal candidate positioning information based on the matching pairs corresponding to each piece of candidate positioning information comprises:
determining an evaluation value of each piece of candidate positioning information based on prior contribution degrees of different candidate map semantic features to vehicle positioning and the matching pairs corresponding to each piece of candidate positioning information; and
selecting candidate positioning information with a maximum evaluation value as the optimal candidate positioning information of the vehicle.

11. The vehicle positioning method according to claim 10, wherein the evaluation value of each piece of candidate positioning information is determined by the following formula:

$$score = \lambda_c \Sigma c_i + \lambda_d \Sigma f(d_i)$$

wherein, score is the evaluation value of each piece of candidate positioning information, $\lambda_c$ and $\lambda_d$ are prior distribution weights, $c_i$ is a prior contribution degree of the candidate map semantic feature in an $i^{th}$ matching pair to vehicle positioning, $d_i$ is a semantic-Euclidean distance of the $i^{th}$ matching pair, and $f(d_i)$ is a mapping function inversely correlated with $d_i$.

12. The vehicle positioning method according to claim 10, wherein after the selecting the candidate positioning information with the maximum evaluation value, the vehicle positioning method further comprises:
judging whether the maximum evaluation value is less than an evaluation value threshold, and when the maximum evaluation value is less than the evaluation value threshold, it is determined that a map matching is failed.

* * * * *